United States Patent [19]

Ballard

[11] 4,186,278
[45] Jan. 29, 1980

[54] END-OF-KEYING CONTROL CIRCUIT

[75] Inventor: James R. Ballard, Pickerington, Ohio

[73] Assignee: Western Electric Company, New York, N.Y.

[21] Appl. No.: 910,191

[22] Filed: May 30, 1978

[51] Int. Cl.² ........................ H04Q 1/50; H04Q 3/47
[52] U.S. Cl. ........................... 179/18 ET; 179/16 EC
[58] Field of Search ..................... 179/16 EC, 18 ET

[56] References Cited

U.S. PATENT DOCUMENTS

| | | | |
|---|---|---|---|
| 2,680,781 | 6/1954 | Avery | 179/18 ET |
| 3,127,479 | 3/1964 | Macurdy et al. | 179/18 ET |
| 3,133,155 | 5/1964 | Kuchas | 179/16 EC |
| 3,159,716 | 12/1964 | Riddell et al. | 179/18 ET |
| 3,204,040 | 8/1965 | Hackett | 179/18 ET |
| 3,291,913 | 12/1966 | Hanna et al. | 179/16 EC |
| 3,322,900 | 5/1967 | Winter | 179/18 ET |
| 3,328,530 | 6/1967 | Schildgen et al. | 179/18 ET |
| 3,985,973 | 10/1976 | Shea | 179/18 ET |

Primary Examiner—Bernard Konick
Assistant Examiner—Randall P. Myers
Attorney, Agent, or Firm—Frederick W. Padden

[57] ABSTRACT

A TOUCH-TONE signal to dial pulse converter arrangement is disclosed in a step-by-step system. The arrangement is equipped with a plurality of trunk circuits interposed between line finder and selector switches for extending calls from TT (TOUCH-TONE) telephones through a switching network to a lesser plurality of TT to DP (Dial Pulse) converters. Each of the converters is time slot connected to a common translator under control of a time slot allotter. The common translator includes a single end-of-keying control circuit having decoders, a cross-connection terminal field, a combinational logic circuit, an encoder and a comparator for cooperating with all of the converters successively in individually assigned time slots to determine when the end-of-keying occurs on each call served by the converters.

12 Claims, 2 Drawing Figures

END-OF-KEYING CONTROL CIRCUIT

TECHNICAL FIELD

This invention relates to a TOUCH-TONE signal to dial pulse converter arrangement for communication switching systems and particularly to a common control circuit for determining the end-of-keying for a plurality of TT (TOUCH-TONE) to DP (Dial Pulse) converters on a time shared basis.

BACKGROUND ART

A substantial percentage of customer originated calls are presently keyed by callers using a TT telephone. The use of TT signaling has proven to be a valuable adjunct to telephone service in that it improves and simplifies customer "dialing" from a human factors standpoint and enables calls to be established more rapidly than with dial pulse signaling.

Many present day switching systems, such as the direct progressive or step-by-step systems, are basically designed to establish switching connections in response to dial pulse signals. In order to enable such systems to operate with customer TT telephones, it was necessary to equip the systems with facilities for converting the customer keyed TT signals into dial pulses.

Typically, such facilities include a plurality of converter circuits for serving a larger plurality of TT customer stations. A converter customarily is connected to a calling station for returning dial tone and then receiving and verifying the validity of the customer keyed TT digits. The converter usually converts the TT digits and then generates the dial pulses required for operating the switching network to extend the call toward its destination.

Efficient and rapid call processing requires that the TT to DP converter facilities ascertain when a calling customer has finished keying of a called customer number. This function permits a converter to complete its outpulsing operations, release rapidly from call connections and become available for serving other calls.

Despite the many innovations which have occurred in TT to DP converter arrangements, a recognized problem in the prior art has been the need for complex and expensive circuitry to be duplicated in each of the TT to DP converters in order to ascertain when the last TT digit has been keyed by a caller.

DISCLOSURE OF THE INVENTION

The foregoing problem is solved and a technical advance is achieved by the provision of a single end-of-keying control circuit for serving a plurality of TT to DP converters on a time division basis. Each of the converters is successively connected individually to the end-of-keying control circuit under control of a time slot allotter circuit and during an individual one of a plurality of repetitive time slots.

In each time slot, the end-of-keying control circuit receives two sets of input signals from the then connected converter. The first set of input signals represents the numerical value of one and more of the TT digits received by that converter. Such digits include, for example, dial zero, international, national and office code digits. The second set of input signals represents the actual number of TT digits received by the converter at that instant of the call. For example, the second set of input signals indicates how many digits have been received on a ten digit call and the actual number increases as TT keying progresses.

The end-of-keying control circuit comprises apparatus responsive to the first set of input signals for specifying the total number of digits expected to be received by the then connected one of the converters during the call. The control circuit is further equipped with circuitry which cooperates with the specifying apparatus and is responsive to the second set of signals for sending an end-of-keying signal to the then connected converter to indicate that the expected number of TT digits have been received. The converter can then operate expeditiously to complete call processing functions, such as outpulsing, and then release for serving other calls.

The specifying apparatus illustratively comprises a cross-connection field including a combinational logic circuit and a plurality of input and output terminals interconnected in a predetermined pattern. The apparatus also includes decoder circuitry responsive to a receipt of the first set of input signals in an n-out-of-x code for supplying to the input terminals of the cross-connection field output signals representing the decimal code value(s) of one and more of the TT digits received by the then connected converter at that point in the call.

A plurality of decoders are included in the decoder circuitry. Each decoder is responsive to separate ones of the first set of input signals for an individual one of the TT digits and for supplying to prescribed ones of the cross-connect input terminals output signals representing the decimal code value of the corresponding TT digit.

The specifying apparatus further includes encoder circuitry which is responsive to the receipt of coded signals from the cross-connect output terminals for generating signals specifying the total number of TT digits expected to be received during the call by the then connected converter.

Another aspect of the control circuit is that a comparator is utilized to compare the number of expected digits with the number of digits actually received and to send an end-of-keying control signal to the converter only during its assigned time slot and when the number of digits actually received are equal to or greater than the number of expected digits. It does so by comparing the signals generated by the encoder circuitry with the second set of input signals received from the converter.

In a preferred embodiment of the invention, the end-of-keying control circuit is integrated into a common translator which serves all of the converters on a time division basis. The translator functions during each time slot to translate keyed digit information into routing and outpulsing instructions for the converters.

Figure 1:
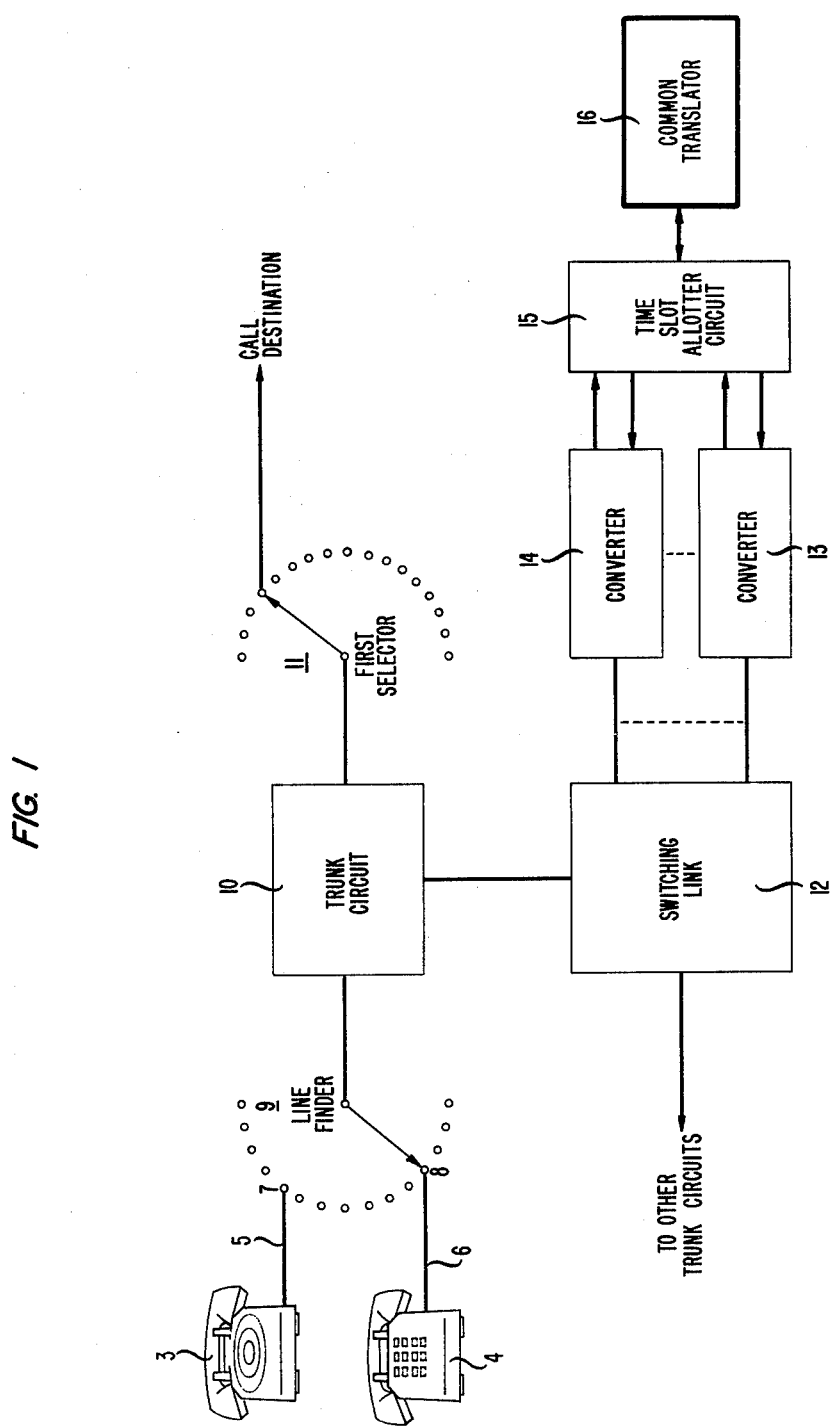
FIG. 1 is a functional block diagram of a step-by-step telephone switching system utilizing this invention.

The invention is particularly concerned with the common translator circuit which is represented by the block shown in heavy lines in FIG. 1. The other equipment units form part of the prior art and therefore are neither shown nor described in detail herein except where needed for a completed understanding of the invention.

DETAILED DESCRIPTION

The prior art circuitry as disclosed in FIG. 1 comprises rotary dial and TOUCH-TONE telephone stations 3 and 4 connected over respective telephone lines 5 and 6 to prescribed bank terminals 7 and 8 of a SXS line finder switch 9. A trunk circuit 10 extends connections from the line finder 9 selectively to a SXS first selector 11 toward a call destination and to a switching link 12 for TOUCH-TONE to dial pulse signal conversion on calls from station 4.

Link 12 is a switching network arranged to connect a plurality of trunk circuits, such as circuit 10, to a lesser plurality of TOUCH-TONE to dial pulse signal converters 13 and 14. Each of the converters 13 and 14, in a known manner, supplies dial tone, receives and verifies TOUCH-TONE digits, converts them to logic levels, stores the logic levels, and generates dial pulses for outpulse transmission through link 12 and the first selector 11 toward the call destination.

A time slot allotter circuit 15 connects a single translator 16 to each of the converters 13 and 14 on a time division basis. Each of the converters 13 and 14 is assigned a specific time slot in a cyclically recurrent time division frame. For example, assume that converters 13 and 14 represent a group of twenty-four converters which share translator 16, then a total of twenty-four time slots are used with each such slot being individually assigned to an individual one of the twenty-four converters.

During its time slot, a converter accesses the translator 16 with keyed digit information and receives back routing and control instructions needed for further processing a call. Typically, the converter supplies information on the dialed digits including international, area and office code digits as well as the total number of dialed digits on a call being served by the converter. Circuit 16 then translates that information and specifies the total number of dialed digits to be expected on the call. Translator 16 next compares the expected number with the actually received number. When the comparison indicates that the received number is greater than or equal to the expected number, the translator 16 signals the converter that the caller has completed TOUCH-TONE keying on the call.

Figure 2:
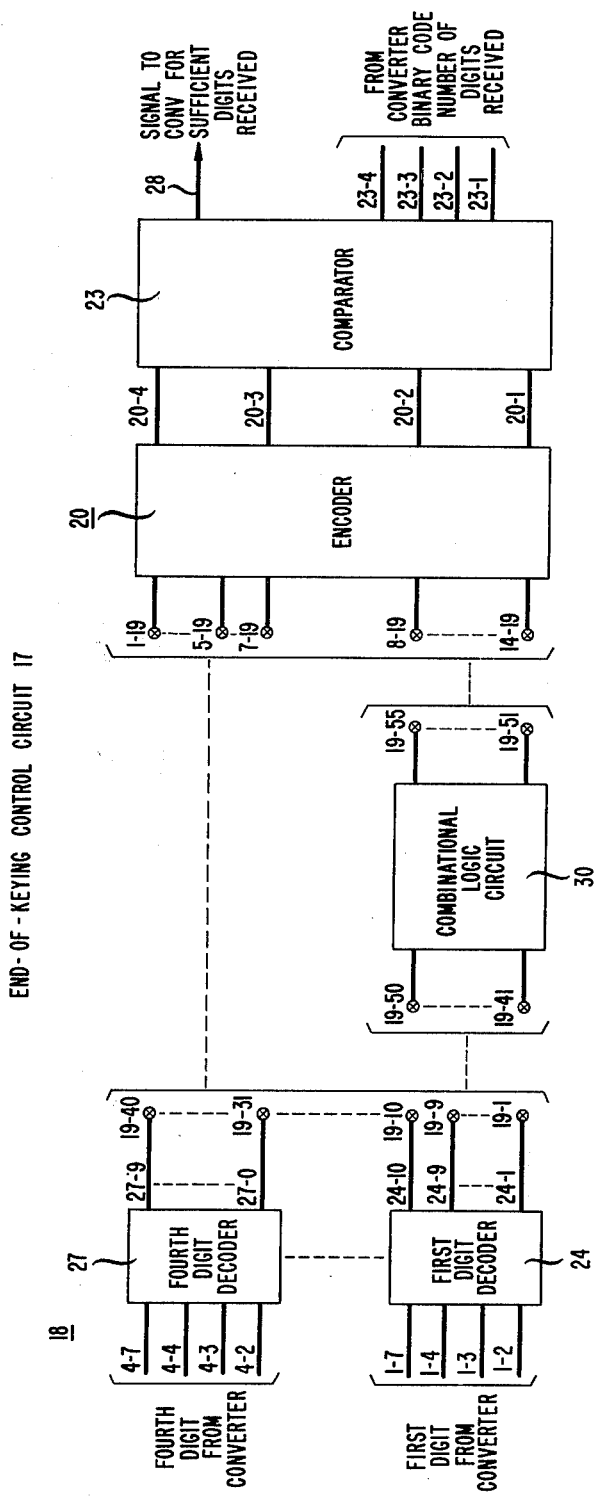
FIG. 2 is a schematic diagram of the "end-of-keying" control circuitry in a common translator circuit.

FIG. 2 discloses the "end-of-keying" control circuitry 17. It comprises five fundamental building blocks, namely, decoder circuitry 18, a cross-connect field 19, a combinational logic circuit 30, an encoder 20, and a comparator 23.

The decoder circuitry 18 includes four decoders 24 through 27 each of which translates a respective one of the first four keyed digits of an international, area or office code. Each of the decoders, such as decoder 24, receives the respective one of the keyed digits via allotter 15 from a converter during each occurrence of its assigned time slot. The digits are received by each decoder over input leads in an n-out-of-4 signal format and are decoded into a 1-out-of-10 signal format on ten output leads which are, in turn, connected to ten cross-connect field terminals. Illustratively, the four leads 1-2, 1-3, 1-4, and 1-7 are inputs to decoder 24 and the ten output leads 24-1 through 24-10 are connected from decoder 24 to respective cross-connect field terminals 19-1 through 19-10.

The number of decoders 24–27 actually employed in a central office depends upon the numbering plan which the telephone system is designed to serve. For example, international dialing service customarily uses a translation of the first four digits received by a converter in order to determine how many digits it is expected to receive. Hence, four decoders 24–27 are provided for such service. Present day United States national numbering plan with zero plus (0+) and one plus (1+) type prefixing requires translation of the first or the first four digits received by a converter in order to determine how many digits it is expected to receive.

Cross-connect field 19 is arranged illustratively with forty input terminals 19-1 to 19-10 through 19-31 to 19-40. These terminals are cross-connected according to the numbering plan either directly to one or more of the fourteen output terminals 1-19 through 14-19 or to one or more of the terminals 19-41 to 19-50 which are connected through the combinational logic circuit 30 to terminals 19-51 to 19-55 which are, in turn, cross-connected to terminals 1-19 through 14-19 for specifying the number of digits expected to be received on the call served by the then associated converter. In the example to be described later with respect to a digit 9 access call, the input terminal 19-9 is cross-connected to terminal 8-19 to represent that eight digits are expected to be dialed by a caller in accordance with the office numbering plan.

The combinational logic circuit 30 is responsive to input signals on one or more of its ten input terminals 19-41 through 19-50 for combining those signals into an output signal on one or more of its five output terminals 19-51 through 19-55. The latter terminals are cross-connected to one or more of the terminals 1-19 through 14-19 in accordance with the local numbering plan.

Encoder 20 functions illustratively to translate 1-out-of-14 input signals on terminals 1-19 through 14-19 into n-out-of-4 binary output signals on the four leads 20-1 through 20-4. The latter signals form one set of inputs to the comparator 23 and are used to represent the number of digits which the "end-of-keying" control circuitry 17 specifies should be received by the converter on the call being served.

During each time slot, comparator 23 compares the signals on leads 20-1 through 20-4 with signals concurrently received on another set of four input leads 23-1 through 23-4 from the last-mentioned converter via allotter 15. The signals on leads 23-1 through 23-4 are in an n-out-of-4 binary format and are supplied by the converter to specify the number of digits which it has received at that instant of the call processing. Comparator 23 is responsive to the binary signals on the two sets of input leads for determining when the number of digits received by the converter equals the number of those expected to be received. When the two numbers are equal, comparator 23 sends an "end-of-keying" signal on lead 28 to the converter.

The operation of the control circuitry 17 of FIG. 2 is now described with reference to a digit 9 access call for which seven digits are expected to be received by the converter 14 following the caller TOUCHTONE keying of an initial digit nine. Time slot 1 of a time division frame of 24 time slots is illustratively assumed to be assigned for serving the call involving the converter 14.

During each recurrence of time slot 1, the time slot allotter 15 interconnects converter 14 and both the decoders 24-27 and the comparator 23 of FIG. 2. The decoder interconnections are established over the leads 1-2 through 1-7 and 4-2 through 4-7. The comparator 23 interconnections are over leads 23-1 through 23-4 and lead 28. It is significant to emphasize that the connections of converter 14 to the control circuitry of FIG. 2 persists only for the duration of the assigned time slot 1 and are opened during all other 23 time slots of the time division frame.

After the first digit, a nine, has been keyed by the calling station, such as station 4 of FIG. 1, following routine call origination and dial tone call processing, it is extended through line finder 9, trunk circuit 10 and switching link 12 to converter 14. The latter then converts the keyed digit nine signals into signals which are extended by allotter 15 illustratively to leads 1-2 and 1-7 of FIG. 2 during each occurrence of time slot 1. Decoder 24 decodes the received signals and applies an electrical signal to lead 24-9 and the cross-connect terminal 19-9 for signifying a receipt of a keyed nine as the first digit.

In accordance with the illustrative embodiment, terminal 19-9 is wire cross-connected to terminal 8-19 for specifying that eight digits are to be received by converter 14. Resultingly, the electrical signal on terminal 19-9 is extended over terminal 8-19 to encoder 20 which is then responsive for generating corresponding number signals on the output leads 20-1 through 20-4 to specify to comparator 23 that eight digits are to be received by converter 14 on the call. At the same time, comparator 23 receives number signals from the converter 14 to signify the then current number of digits which it has received.

The foregoing signal conditions and circuit operations persist on each subsequent repetition of time slot 1 except that converter 14 changes the binary number signal applied to leads 23-1 through 23-4 as each of the seven subsequent digits are keyed at station 4. When a comparison of the binary number signals on leads 20-1 through 20-4 and 23-1 through 23-4 indicates that they are equal, comparator 23 sending an "end-of-keying" signal over lead 28 which enables converter 14 via allotter 15 to recognize that caller keying has terminated and to proceed with other routine functions, such as called number dial pulsing through switching link 12, trunk circuit 10 and the first selector 11 toward the call destination.

Circuit 17 is also usable for determining the end-of-keying on other single digit and multidigit calls keyed by a caller. Illustratively, on a five digit call, the digits 234 are dialed as the first 3 digits and, accordingly, terminals 19-2, 19-13, and 19-24 are cross-connected to terminals 19-41 through 19-43 and the terminal 19-51 is cross-connected to terminal 5-19. When the digits 234 are registered in decoders 24, 25 and 26, respectively, the combinational logic circuit 30 provides a signal to terminal 19-51 and through the cross-connect field 19 to terminal 5-19 of the encoder 20. The encoder 20 and comparator 23 then function as previously described to generate the appropriate occurrence of the end-of-keying control signal on lead 28.

I claim:

1. An end-of-keying control circuit for a TOUCH-TONE signal to dial pulse converter arrangement suitable for use on a call in a communication switching system having
    a plurality of converters (13, 14) for converting into dial pulses the TOUCH-TONE digits received on said call,
    a common translator (16) time shared by each of said converters (13, 14), and
    circuitry (15) successively connecting each one of said converters (13, 14) individually to translator (16) during an assigned individual one of a plurality of repetitive time slots,
characterized in that
said translator (16) comprises said end-of-keying control circuit (17) responsive to a receipt from the time slot connected one of said converters (13, 14) of first input signals representing the numerical value of each one and more of said TOUCH-TONE digits and of second input signals representing the actual number of said TOUCH-TONE digits received by said connected one of said converters (13, 14) for generating an end-of-keying control signal to indicate when the total expected number of said TOUCH-TONE digits have been received by said connected one of said converters (13, 14).

2. An end-of-keying control circuit of claim 1 characterized in that
said control circuit (17) comprises
apparatus (18, 19, 20) responsive to a receipt of said first input signals for supplying coded signals specifying the total number of said TOUCH-TONE digits expected to be received by said connected one of said converters (13, 14) during said call.

3. An end-of-keying control circuit of claim 2 characterized in that
said apparatus comprises
a cross-connected field (19) of input and output terminals interconnected in a predetermined pattern,
circuitry (18) for decoding said first input signals and applying the decoded signals to a prescribed number of said input terminals, and
encoder means (20) responsive to a receipt of said decoded signals from said output terminals for generating encoded signals representing the number of said TOUCH-TONE digits expected to be received on said call.

4. An end-of-keying control circuit of claim 3 characterized in that
said control circuit (17) further comprises
a comparator (23) responsive to a receipt of said encoded signals and to said second input signals for generating said end-of-keying control signal to indicate when said expected number and said actual number of said TOUCH-TONE digits are equal.

5. An end-of-keying control circuit for a TOUCH-TONE signal to dial pulse converter arrangement suitable for use on a call in a communication switching system having
    a plurality of converters (13, 14) for converting into dial pulses the TOUCH-TONE digits received on said call,
    a common translator (16) time shared by each of said converters (13, 14),
    circuitry (15) successively connecting each one of said converters (13, 14) individually to said translator (16) during an assigned individual one of a plurality of repetitive time slots,
characterized in that
said translator (16) comprises said end-of-keying control circuit (17) and said circuit includes
apparatus (18, 19, 20) responsive to a receipt from the time slot connected one of said converters (13, 14) of input signals representing the numerical value of each one and more of said TOUCH-TONE digits and for supplying coded signals specifying the total number of said digits expected to be received by said connected one of said converters (13, 14) during said call, and circuitry (23) responsive to a receipt of said coded signals and to other signals from said connected one of said converters (13, 14) representing the actual number of said TOUCH-TONE digits received by said connected one of said converters (13, 14) for sending a control signal to said connected one of said converters (13, 14) indicating that the expected number of said TOUCH-TONE digits has been received.

6. An end-of-keying control circuit of claim 5 characterized in that said apparatus (18, 19, 20) comprises a cross-connect field (19) having a plurality of input and output terminals (19-1 through 19-40, 1-19 through 14-19) interconnected in a predetermined pattern, and said sending circuitry (23) comprises a comparator (23).

7. An end-of-keying control circuit of claim 5 characterized in that said apparatus (18, 19, 20) comprises a cross-connect field (19) having a plurality of input and output terminals (19-1 through 19-40, 1-19 through 14-19) interconnected in a predetermined pattern and controlled by said input signals from said time slot connected one of said converters (13, 14) for producing output coded signals specifying the total number of said TOUCH-TONE digits expected to be received by said connected one of said converters (13, 14) during said call.

8. An end-of-keying control circuit of claim 7 characterized in that said apparatus (18, 19, 20) further comprises decoder circuitry (18) responsive to a receipt of said input signals in an n-out-of-x code for supplying to said input terminals (19-1 through 19-40) output signals representing said numerical value of each one and more of said TOUCH-TONE digits in a decimal code.

9. An end-of-keying control circuit of claim 8 characterized in that said decoder circuitry (18) comprises a plurality of decoders (24–27) each one of which is responsive to input signals for an individual one of said TOUCH-TONE digits received by said connected one of said converters (13, 14) and for supplying to prescribed ones of said input terminals (19-1 through 19-40) said output signals representing said numerical value of said individual one of said digits in a decimal code.

10. An end-of-keying control circuit of claim 7 characterized in that said apparatus (18, 19, 20) further comprises encoder circuitry (20) responsive to a receipt of said output coded signals from said output terminals (1-19 through 1-14) of said cross-connect field (19) for supplying said coded signals specifying the total number of said TOUCH-TONE digits expected to be received by said connected one of said converters (13, 14) during said call.

11. An end-of-keying control circuit of claim 10 characterized in that said sending circuitry (23) comprises a comparator (23) responsive to said coded signals supplied by said encoder circuitry (20) and to said other signals from said connected one of said converters (13, 14) for sending an end-of-keying control signal to said connected one of said converters (13, 14) when the actual number of said TOUCH-TONE digits recieved by said connected one of said converters (13, 14) is equal to said expected number of said TOUCH-TONE digits.

12. An end-of-keying control circuit of claim 11 characterized in that said apparatus (18, 19, 20) further comprises a combinational logic circuit (30) including a plurality of input and output terminals (19-41 through 19-50 and 19-51 through 19-55), said input terminals (19-41 through 19-50) being selectively cross-connected to said cross-connect field input terminals (19-1 through 19-40) and said output terminals (19-51 through 19-55) being selectively cross-connected to said cross-connect field output terminals (1-19 through 14-19) in a prescribed pattern, and said combinational logic circuit (30) being responsive to one and more signals on said input terminals (19-41 through 19-50) for combining said last-mentioned signals into a signal on a designated one of said output terminals (19-51 through 19-55).

* * * * *